(12) United States Patent
Pollutro et al.

(10) Patent No.: US 8,234,699 B2
(45) Date of Patent: *Jul. 31, 2012

(54) METHOD AND SYSTEM FOR ESTABLISHING THE IDENTITY OF AN ORIGINATOR OF COMPUTER TRANSACTIONS

(75) Inventors: Dennis Vance Pollutro, Clymer, NY (US); Andrew A. Almquist, Jamestown, NY (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1217 days.

This patent is subject to a terminal disclaimer.

(21) Appl. No.: 10/583,578

(22) PCT Filed: Dec. 22, 2004

(86) PCT No.: PCT/US2004/043405
§ 371 (c)(1),
(2), (4) Date: Mar. 27, 2007

(87) PCT Pub. No.: WO2005/066737
PCT Pub. Date: Jul. 21, 2005

(65) Prior Publication Data
US 2007/0283141 A1 Dec. 6, 2007

Related U.S. Application Data

(60) Provisional application No. 60/533,769, filed on Dec. 31, 2003.

(51) Int. Cl.
*G06F 7/04* (2006.01)
*G06F 15/16* (2006.01)
*G06F 17/30* (2006.01)
*H04L 29/06* (2006.01)

(52) U.S. Cl. .......... 726/7; 726/6; 726/12; 709/238; 709/237; 709/226; 709/232; 709/245; 709/220; 709/223; 709/206; 455/445; 455/428; 455/432.1; 713/153; 719/328; 370/397

(58) Field of Classification Search .......... 713/186
See application file for complete search history.

(56) References Cited

U.S. PATENT DOCUMENTS 5,218,637 A 6/1993 Angebaud et al.
(Continued)

FOREIGN PATENT DOCUMENTS

CA 2 286 534 4/2001
(Continued)

OTHER PUBLICATIONS

International Search Report for International Application No. PCT/US2004/043405 completed Mar. 15, 2005 and mailed Mar. 23, 2005.

(Continued)

*Primary Examiner* — Nathan Flynn
*Assistant Examiner* — Bryan Wright
(74) *Attorney, Agent, or Firm* — Foley and Lardner LLP; Christopher J. McKenna

(57) ABSTRACT

A method of identifying the originator of a message transmitted between a client and a server system is provided. The method includes modifying a message to be transmitted between a client and a server system to include a session identification flag and/or a session identifier 500 (e.g., at an end of the message). The method optionally includes one or more of the steps of re-computing a control portion of the message to reflect the inclusion of the session identification flag and the session identifier 502, transmitting the message between the client and the server system 504, and checking the transmitted message for the session identification flag 506, reading the session identifier of the transmitted message to determine the originator of the message 508, removing the session identification flag and/or the session identifier from the transmitted message 510, and re-computing the control portion of the message to reflect the removal of the session identification flag and/or the session identifier 512.

20 Claims, 5 Drawing Sheets

U.S. PATENT DOCUMENTS

| | | |
|---|---|---|
| 5,757,916 A | 5/1998 | MacDoran et al. |
| 5,784,562 A | 7/1998 | Diener |
| 5,887,065 A | 3/1999 | Audebert |
| 6,021,495 A | 2/2000 | Jain et al. |
| 6,070,245 A | 5/2000 | Murphy et al. |
| 6,076,108 A | 6/2000 | Courts et al. |
| 6,105,136 A | 8/2000 | Cromer et al. |
| 6,141,758 A | 10/2000 | Benantar et al. |
| 6,145,083 A | 11/2000 | Shaffer et al. |
| 6,161,182 A | 12/2000 | Nadooshan |
| 6,199,113 B1 | 3/2001 | Alegre et al. |
| 6,253,326 B1 | 6/2001 | Lincke et al. |
| 6,304,969 B1 | 10/2001 | Wasserman et al. |
| 6,345,291 B2 | 2/2002 | Murphy et al. |
| 6,393,569 B1 | 5/2002 | Orenshteyn |
| 6,418,472 B1 | 7/2002 | Mi et al. |
| 6,470,453 B1 | 10/2002 | Vilhuber |
| 6,480,967 B1 | 11/2002 | Jensen et al. |
| 6,502,192 B1* | 12/2002 | Nguyen .......................... 726/4 |
| 6,856,330 B1 | 2/2005 | Chew et al. |
| 6,947,992 B1 | 9/2005 | Shachor |
| 7,149,803 B2 | 12/2006 | Douglis et al. |
| 7,331,061 B1 | 2/2008 | Ramsey et al. |
| 7,386,889 B2* | 6/2008 | Shay ............................... 726/26 |
| 7,644,434 B2 | 1/2010 | Pollutro et al. |
| 2001/0054147 A1 | 12/2001 | Richards |
| 2002/0080822 A1 | 6/2002 | Brown et al. |
| 2002/0133723 A1 | 9/2002 | Tait |
| 2002/0146129 A1 | 10/2002 | Kaplan |
| 2003/0005118 A1* | 1/2003 | Williams ...................... 709/225 |
| 2003/0005300 A1 | 1/2003 | Noble et al. |
| 2003/0033545 A1 | 2/2003 | Wenisch et al. |
| 2003/0063750 A1 | 4/2003 | Medvinsky et al. |
| 2003/0083991 A1 | 5/2003 | Kikinis |
| 2003/0200439 A1 | 10/2003 | Moskowitz |
| 2003/0208562 A1 | 11/2003 | Hauck et al. |
| 2004/0006710 A1 | 1/2004 | Pollutro et al. |
| 2004/0214576 A1* | 10/2004 | Myers et al. .................. 455/445 |
| 2004/0230797 A1 | 11/2004 | Ofek et al. |
| 2007/0113269 A1 | 5/2007 | Zhang |

FOREIGN PATENT DOCUMENTS

| | | |
|---|---|---|
| EP | 1 071 256 | 1/2001 |
| JP | 06097905 | 8/1994 |
| JP | 11205388 A | 7/1999 |
| JP | 2001306521 | 2/2001 |
| JP | 2003008651 | 10/2003 |

OTHER PUBLICATIONS

Aleksander Svelokken, "Biometric Authentication and Identification Using Keystroke Dynamics With Alert Levels", Master Thesis (Retrieved from University of Oslo), May 23, 2007, pp. 1-124.

Office Action for U.S. Appl. No. 10/423,444 dated Jun. 13, 2006.

Office Action for U.S. Appl. No. 10/423,444 dated Mar. 12, 2007.

Office Action for U.S. Appl. No. 10/423,444 dated Sep. 7, 2007.

Office Action for U.S. Appl. No. 10/423,444 dated Mar. 14, 2008.

Office Action for U.S. Appl. No. 10/423,444 dated Sep. 19, 2008.

Office Action for U.S. Appl. No. 10/423,444 dated Dec. 2, 2008.

Office Action for U.S. Appl. No. 10/423,444 dated Feb. 25, 2009.

Office Action for U.S. Appl. No. 10/423,444 dated Jul. 27, 2009.

Notice of Allowance for U.S. Appl. No. 10/423,444 dated Nov. 16, 2009.

Office Action for Japanese Application 2006-547397 dated Nov. 30, 2010.

Office Action for Japanese Application 2006-547397 dated Jul. 5, 2011.

Office Action for U.S. Appl. No. 12/163,292 dated Feb. 2, 2011.

Office Action for U.S. Appl. No. 12/163,292 dated Aug. 8, 2011.

* cited by examiner

METHOD AND SYSTEM FOR ESTABLISHING THE IDENTITY OF AN ORIGINATOR OF COMPUTER TRANSACTIONS

This application is a U.S. National Phase Application of PCT International Application No. PCT/US2004/043405, filed Dec. 22, 2004, the contents of which are incorporated by reference.

CROSS REFERENCE TO RELATED CASES

This PCT application claims the benefit of U.S. Provisional Application 60/533,769 filed in the U.S. Patent and Trademark Office on Dec. 31, 2003, the contents of which are herein incorporated by reference.

FIELD OF THE INVENTION

This invention relates to computer system security, and more particularly, to identifying an originator of a computer transaction.

BACKGROUND OF THE INVENTION

It is often desirable to control the accessibility of computer system resources that are accessible through networks such as LANs, WANs, and the Internet. Recently, security and access concerns have grown as malicious trespasses have increased the desirability to have improved access control. Further, the heightened state of awareness related to threats of cyber terrorism make the desire to reduce existing vulnerabilities greater than ever before.

A key to restricting access to network resources is the ability to distinguish between different users once they have been identified. Conventional methods involve creating a session identifier for a user once the user has been identified. If the client-server application is capable, the session identifier may be embedded in the application data that is sent back and forth between the client and server. One example of this is embedding a cookie in a web browser. Unfortunately, many applications were never designed to handle session identifiers and cannot practically be made to accommodate session identifiers. For such applications, present solutions relate to using the session identifier from the network address of the client. Unfortunately, network addresses are often overridden by network gateways, and as such, the reliability of this identifying information is substantially diminished.

FIG. 1 is a block diagram illustration of several users (i.e., User 1, User 2, and User 3 with network addresses 192.168.10.10, 192.168.10.11 and 192.168.10.12, respectively) communicating with a network through a common gateway 40 (i.e., 192.168.1.1). Because the gateway 40 overwrites the network addresses 192.168.10.10, 192.168.10.11 and 192.168.10.12 of the users 10, 20 and 30, respectively, with its own network address 192.168.1.1, the server 50 (i.e., having a network address 192.168.1.13) sees every user 10, 20 and 30 coming through the gateway 40 as having the same network address (i.e., 192.168.1.1).

In configurations where it is not possible or practical to place a session identifier in the client-server application, it would be desirable to provide a method of identifying an originator of a computer transaction that overcomes at least one of the above-described deficiencies.

SUMMARY OF THE INVENTION

According to an exemplary embodiment of the present invention, a method of identifying the originator of a message transmitted between a client and a server system is provided. The method includes modifying a message to be transmitted between a client and a server system to include a session identification flag and/or a session identifier (e.g., at an end of the message transmitting the message between the client and the server system, checking the transmitted message for the session identification flag, and reading the session identifier of the transmitted message to determine the originator of the message.

The method optionally includes one or more of the steps of removing the session identification flag and the session identifier from the transmitted message, and re-computing the control portion of the message to reflect the removal of the session identification flag and the session identifier.

According to another exemplary embodiment of the present invention, a method of identifying the originator of a message transmitted between a client and a server system is provided. The method includes establishing a common security identifier in the client and server systems, modifying a message to be transmitted between a client and a server system to include an session identifier and the common security identifier, a presence of the common security identifier indicating that the session identifier is embedded in the modified message, transmitting the modified message between the client and the server system, comparing the common security identifier in the transmitted message to validate the session identifier, and if the embedded security identifier is validated, determining the originator of the transmitted message based on the embedded session identifier and processing the transmitted message according to predetermined rules for transmitted messages with embedded session identifiers.

According to yet another exemplary embodiment of the present invention, a method of identifying an originator of all communication packets transmitted between a client and a server system using an application program is provided. The method includes modifying each of the communication packets to be transmitted between a client and a server system to include information identifying the originator of a respective communication packet without regard for the application program being used or an apparent network address of the originator, transmitting each modified communication packet between the client and the server system, and determining the originator of each transmitted communication packet based on the information identifying the originator therein.

According to yet another exemplary embodiment of the present invention, a computer system for identifying the originator of a message is provided. The computer system includes a server, and a client operationally connected to the server, the client and server to transmit one or more messages therebetween, each of the messages to be transmitted being modified by one of the client or the server to include a session identification flag and a session identifier and the modified message being transmitted to the remaining one of the client and the server such that the session identification flag of the transmitted message is checked by the remaining one of the client and the server to validate the session identifier, and if the session identifier is validated, the session identifier of the transmitted message is read to determine the originator of the transmitted message.

According to yet another exemplary embodiment of the present invention, a computer readable carrier including computer program instructions which cause a computer system including at least a client and a server to implement a method of identifying the originator of a message transmitted between the client and the server is provided. The method includes modifying a message to be transmitted between the client and the server to include a session identification flag and a session identifier, re-computing a control portion of the message to reflect the inclusion of the session identification flag and the session identifier at the end of the message, transmitting the message between the client and the server, checking the transmitted message for the session identification flag, reading the session identifier of the transmitted message to determine the originator of the message, removing the session identification flag and the session identifier from the transmitted message, and re-computing the control portion of the message to reflect the removal of the session identification flag and the session identifier.

BRIEF DESCRIPTION OF THE DRAWINGS

Exemplary embodiments of the invention will be described with reference to the drawings, of which.

DETAILED DESCRIPTION OF THE INVENTION

Figure 1:
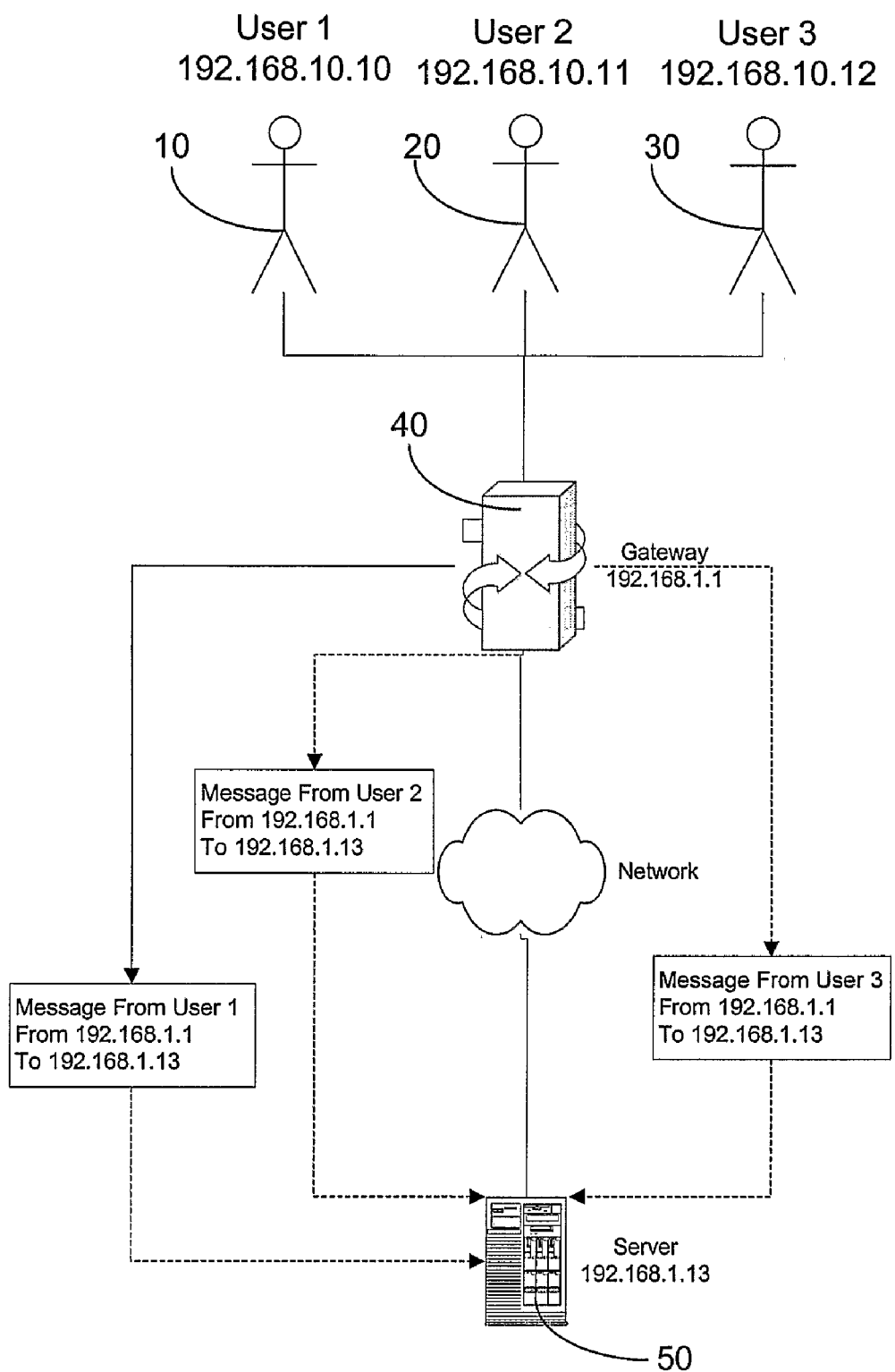
FIG. 1 is a block diagram illustrating communications from three users to a server system through a common network gateway.

Preferred features of selected embodiments of this invention will now be described with reference to the figures. It will be appreciated that the spirit and scope of the invention is not limited to the embodiments selected for illustration. It is contemplated that any of the embodiments described hereafter can be modified within the scope of this invention.

The present invention relates to computer system security. U.S. patent application Ser. No. 10/423,444, filed Apr. 25, 2003, entitled "COMPUTER SECURITY SYSTEM," also relates to computer system security, and is incorporated by reference herein in its entirety. PCT International Application filed on Dec. 15, 2004, entitled "COMPUTER SECURITY SYSTEM" also relates to computer system security, and is also incorporated by reference herein in its entirety. PCT International Application, filed concurrently herewith, entitled "METHOD AND SYSTEM FOR DELEGATING ACCESS TO COMPUTER NETWORK RESOURCES" (Attorney Docket No. SYNC-102WO) also relates to computer system security, and is incorporated by reference herein in its entirety.

Generally, an exemplary embodiment of the present invention relates to a security system that enables one, some or all users to be identified by a unique session identifier regardless of the application being used or the apparent network addresses of the users (i.e., a network address that may be overwritten by a network device such as a network gateway). Thus, user communications that go through a common network gateway that masks their true network addresses can be distinguished through their unique session identifier. A session identifier may be assigned to a user/client when beginning a server session. It may allow the user/client to be uniquely identified among all current users/clients of a server. It is preferable to use a client IP address to generate the session identifier. Moreover, session identifiers may expire, for example, due to termination of the corresponding session.

In certain exemplary embodiments of the present invention, a method of modifying networking protocols is provided that is computationally simple, is compatible with and expands upon existing network protocols, and is compatible with various encryption techniques. For example, the method optionally includes identifying a user and creating a corresponding session identifier. The session identifier may be changed with each communication, may be changed at a predetermined interval, or may remain constant for the user.

If the communication/message is sent from a client to a server, the message may be modified on the client side (i.e., at the client or on the side of the network gateway of the client) to add a session identification flag and a session identifier at the end of the message. A control portion of the message may also be re-computed on the client side to take into account the inclusion of the session identification flag and the session identifier at the end of the message.

After transmission to the server, the message is checked on the server side (i.e., at the server or on the side of the network gateway of the server) for the session identification flag. If the session identification flag exists, the session identifier is read on the server side. If the session identification flag exists, the session identification flag and the session identifier are removed on the server side. The control portion of the message may then be re-computed to take into account the removal of the session identification flag and the session identifier.

Of course, the process may be applied to messages from the server side to the client side. Further still, certain actions described with respect to one side (i.e., the client side or the server side) may be accomplished on the alternative side if desired.

In another embodiment, a client-server algorithm is provided in a computer readable medium that includes computer program instructions that cause servers and clients to implement the above-described method.

Through the various exemplary embodiments disclosed herein, a security system for securing information is provided. Additionally, methods of providing access to information, and restricting access to information, using the security system, are also disclosed. The disclosed invention is particularly suited, according to preferred embodiments, to the security of remotely accessed network environments through a network connection though other applications are contemplated as well.

According to certain exemplary embodiments of the present invention, a message may be sent to the security system from an external source (e.g., a user). A determination may be made as to whether the message contains an embedded session identifier. If the message does contain an embedded session identifier, the identifier may be used to determine how to process the message. The session identifier is stripped from the message and the message is repackaged into its original unmodified form and passed on appropriately. If the message does not contain an embedded session identifier, it can be rejected or processed according to the rules in place for messages without embedded session identifiers.

According to certain exemplary embodiments of the present invention used as part of a security system, the embedded session identifier allows one to reliably control the visibility of network resources to remote users of that network regardless of the applications being used. For example, the network may be configured to determine a user identity from the embedded session identifier instead of the user's network address. Because of the extensive use of network address translations and network gateways, network addresses can be arbitrary. However, the security system according to certain exemplary embodiments, may act as an umbrella over the remotely accessed network (i.e., may act to exclude unauthorized users) and may allow users to be identified by a unique session identifier rather than their apparent network address.

According to an exemplary embodiment of the present invention, all connectivity to the protected network must pass through the security system though it is also contemplated that at least selected connectivity to the protected network may not pass through the security system. Once a user has been authenticated, a session identifier may be created and embedded in all messages sent to and from the user according to an exemplary embodiment of the invention. The security system then checks all incoming messages for embedded session identifiers. If the message contains an embedded session identifier, it is read. If the session identifier is valid, the message is repackaged into its original unmodified form and processed according to the rules for the user associated with that session identifier. If the session identifier is not valid, the message is dropped. If the message does not contain an embedded session identifier the message can be processed in one of two ways: it can be dropped or it can be processed according to the rules for messages without embedded session identifiers.

In certain exemplary embodiments, all communication between the user and the network is encrypted so as to hide the communications from other authenticated and non-authenticated users (including users connected via the Internet). As such, session identification modification is either done after the encryption or before the encryption. If the modification is done after the encryption, the session identification is read and the message is repackaged before it is decrypted. If the modification is done before the encryption, the message is decrypted before the session identification is read and the message is repackaged. That is, an encrypting unit may be disposed on one side of the network gateway to encrypt the message to be transmitted and a decrypting unit may be disposed on the other side of the network gateway to decrypt the transmitted message. An encrypting unit and/or a decrypting unit may be included, for example, in the client and server system or on the client and server sides of the network.

A timeout feature may also be provided whereby the expiration of a predetermined period of inactivity is used to determine when the session (and the session ID) should be terminated. During the user's session, the inactivity/timeout period is continually updated. The timeout period is set by resources in the network and if the user does not perform an action/interaction within the predetermined timeout period, the session is terminated by deleting it from those same resources in the network. This allows a high level of security because meaningful information is not stored on the user's computer. Further, even if someone does gain access to the user's computer, after the timeout period has expired, any information that might be stored in a file (e.g., cookie) on the user's computer is no longer valid.

In certain embodiments of the present invention, after the user has logged in, a number of checks may take place each time the user moves within the system in order to determine what resources the user can access. For example, the security system may determine the identity of the user accessing the system. The session may be validated by checking the user ID against a database of user IDs on the network. If a session ID is invalid, the session is invalid, and the user is forced to log in before accessing the system. If the session ID is valid, the system retrieves the associated user ID and continues to perform whatever actions are necessary to finish displaying the approved information.

Through various exemplary embodiments, the process of accessing a resource (e.g., an application) on a remote server begins with the user logging into the security system (e.g., logging in using a single sign on software that logs the user directly into the security system). Once logged in, a session identifier is created and embedded in all communications between the user and the network. The user can run client applications that connect to applications hosted on the application server and view objects if the client applications have been pre-configured with the addresses of the application servers. If the client applications have not been pre-configured with the addresses of the application server, the user can be provided with a unique token that provides a single use link to the application server. The token either contains the information required to connect to the application server or retrieves the information required to connect to the application server. The client application then connects to the application server, and the application server then displays all objects and applications approved for the user.

The figures described herein illustrate a modification to a network protocol and may utilize common programming languages. This security system contemplates the desire to provide secure access to all remote applications, software, and content. The security system also contemplates and provides embodiments that involve installation of the services on the remote user's device.

The security system of the present invention may be implemented in a number of mediums. For example, the system can be installed on an existing computer system/server as software. Further, the system can operate on a stand alone computer system (e.g., a security server) that is installed between another computer system (e.g., an application server) and an access point to another computer system. Further still, the system may operate from a computer readable carrier (e.g., solid state memory, optical disk, magnetic disk, radio frequency carrier wave, audio frequency carrier wave, etc.) that includes computer instructions (e.g., computer program instructions) related to the security system.

Figure 2:
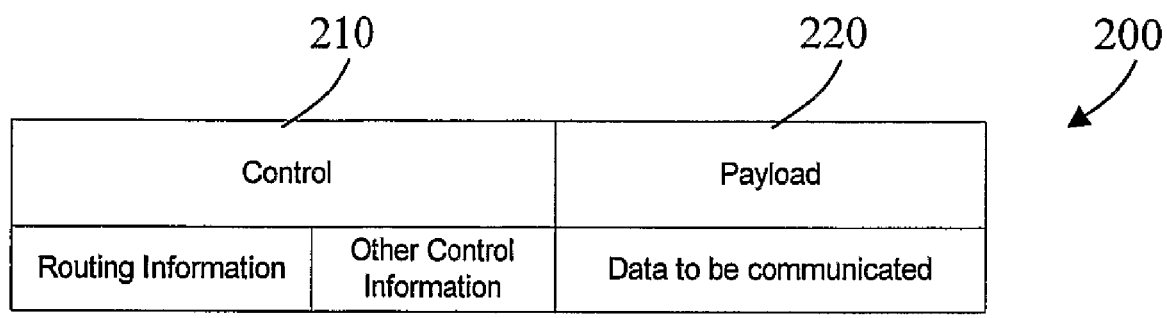
FIG. 2 is a block diagram illustration of the contents of a message in a typical computer networking protocol.

The present invention, according to the exemplary embodiments selected for illustration in the figures, relates to the modification of existing network protocols to embed a session identifier into the messages sent back and forth between a client and a server. FIG. 2 is an illustration of a typical message 200 that is sent over computer networks. The message 200 consists of a control portion 210 and a payload portion 220. The control portion 210 contains information that allows the message 200 to be routed to and received by the proper network location (e.g., routing information and other control information such as hardware address data). The payload portion 220 contains the actual data to be communicated.

The network protocol modification consists of a client portion and a server portion. If the message is sent by a client to a server, the client portion may be modified in three steps. The first step is to add a flag to the message (such as at the end of the message) that indicates that the message contains an embedded session identifier. The second step is to add the session identifier to the message (such as after the flag). Finally, the third step is to re-compute the control portion of the message to take into account the data added to the message in the first and second steps. The message which includes the modified network protocol may be communicated over a computer system (e.g., a network), such as the one depicted in FIG. 1. That is, the computer system (see FIG. 1) may include a server and a client operationally connected to the server to transmit one or more messages therebetween. Each of the messages to be transmitted may be modified by one of the client or the server to include a session identification flag (security identifier or tag) and a session identifier, and the modified message may be transmitted to the remaining one of the client and the server such that the session identification flag of the transmitted message is checked by the remaining one of the client and the server to validate the session identifier. Moreover, if the session identifier is validated, the session identifier of the transmitted message may be read to determine the originator of the transmitted message.

The computer system may further include a network gateway disposed operationally between the client and server and providing access to the server, and the server may be remotely accessible by the client. Further, the network gateway may include a database to validate the session identifier by checking a user identifier. If the session identifier is not valid, the computer system may force the user to log in prior to accessing the server and, otherwise, if the session identifier is valid, the computer system may retrieve an associated user identifier and the server may process the transmitted message.

Figure 3:
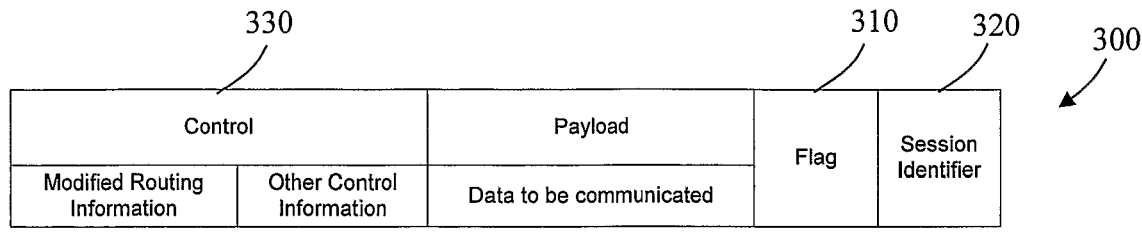
FIG. 3 is an illustration of the message depicted in FIG. 2 modified in accordance with an exemplary embodiment of the present invention.

FIG. 3 is an illustration of the message 300 depicted in FIG. 2 after network protocol modification. A flag 310 has been added after the end of the original message. A session identifier 320 has been added after the flag, 310 and the control portion 330 of the message 300 has been altered to take into account the added flag 310 and session identifier 320. For example, the control portion 330 may include data related to the length of the data portion, or data related to a CheckSum calculation. By increasing the length of the data portion (through the inclusion of the session identifier and the flag) these values in the control portion 330 are affected, and as such, are re-computed.

Figure 4:
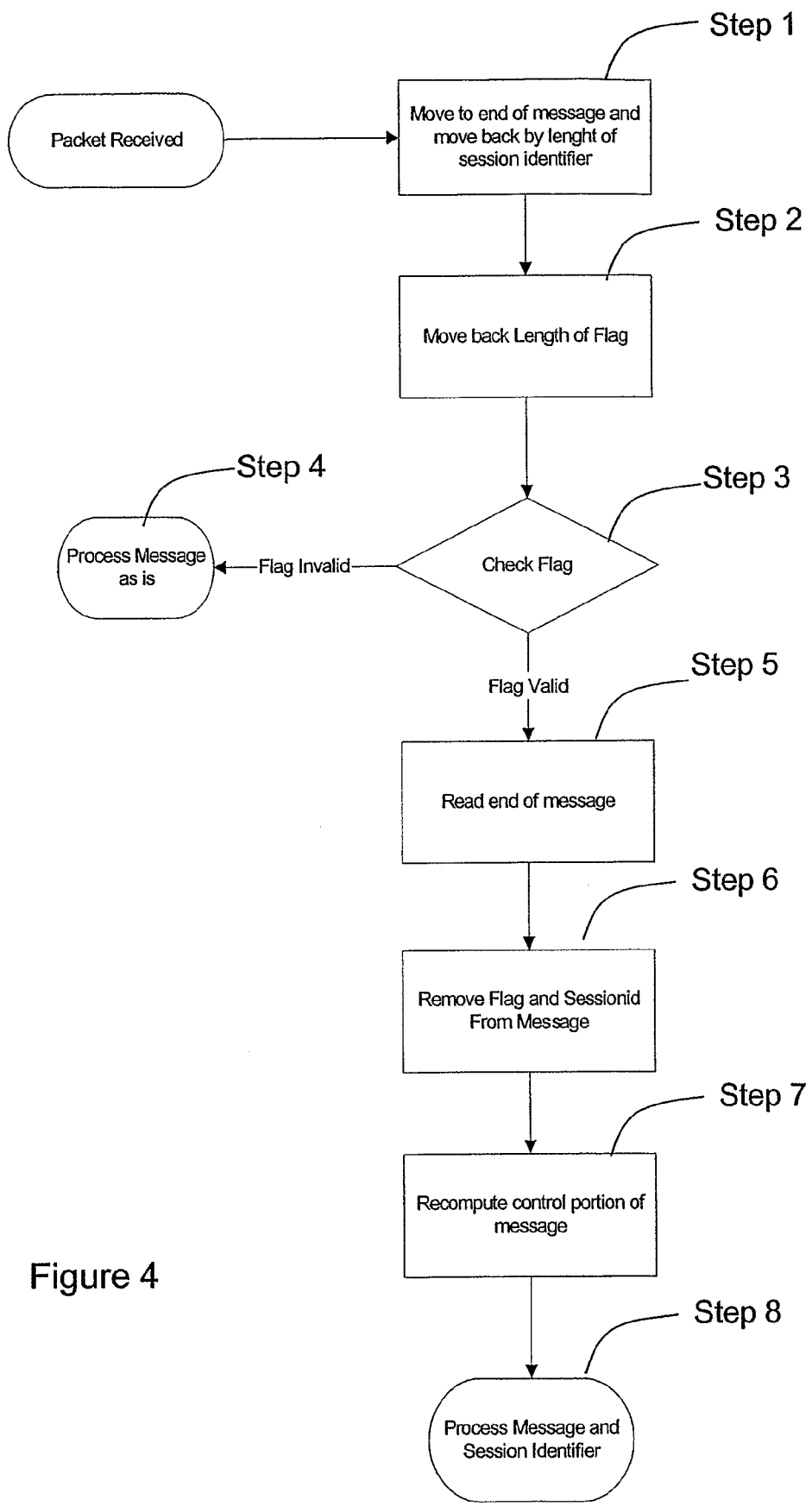
FIG. 4 is a flow diagram illustrating a method through which a server reads messages in accordance with an exemplary embodiment of the present invention.

FIG. 4 is an illustration of a flow diagram illustrating an exemplary method through which a server reads messages. The server desirably analyzes every message received. After a communication packet is received by the server, it is determined whether a flag is added that indicates that the message contains an embedded identifier, by starting at the end of the message and moving back by the length of the session identifier at step 1. For example, this length may be agreed upon (e.g., predetermined), and as such, the server desirably knows this length. After step 1, the data is read by moving back by the length of the flag at step 2. After step 2, it is determined if the data matches the session identification flag at step 3. If the flag does not match, the message has not been modified by the protocol and one proceeds to step 4. At step 4, the message is processed as is. If the flag does match the session identification flag, the message has been modified by the protocol and one proceeds to step 5. At step 5, the end of the message (i.e., the session identifier) is read. After step 5 the flag and the session identifier are removed from the end of the message at step 6. After step 6, the control portion of the message is recomputed to take into account that the flag and session identifier have been removed from the end of the message at step 7. After step 7 the resulting message is processed along with the session identifier at step 8.

Figure 5:
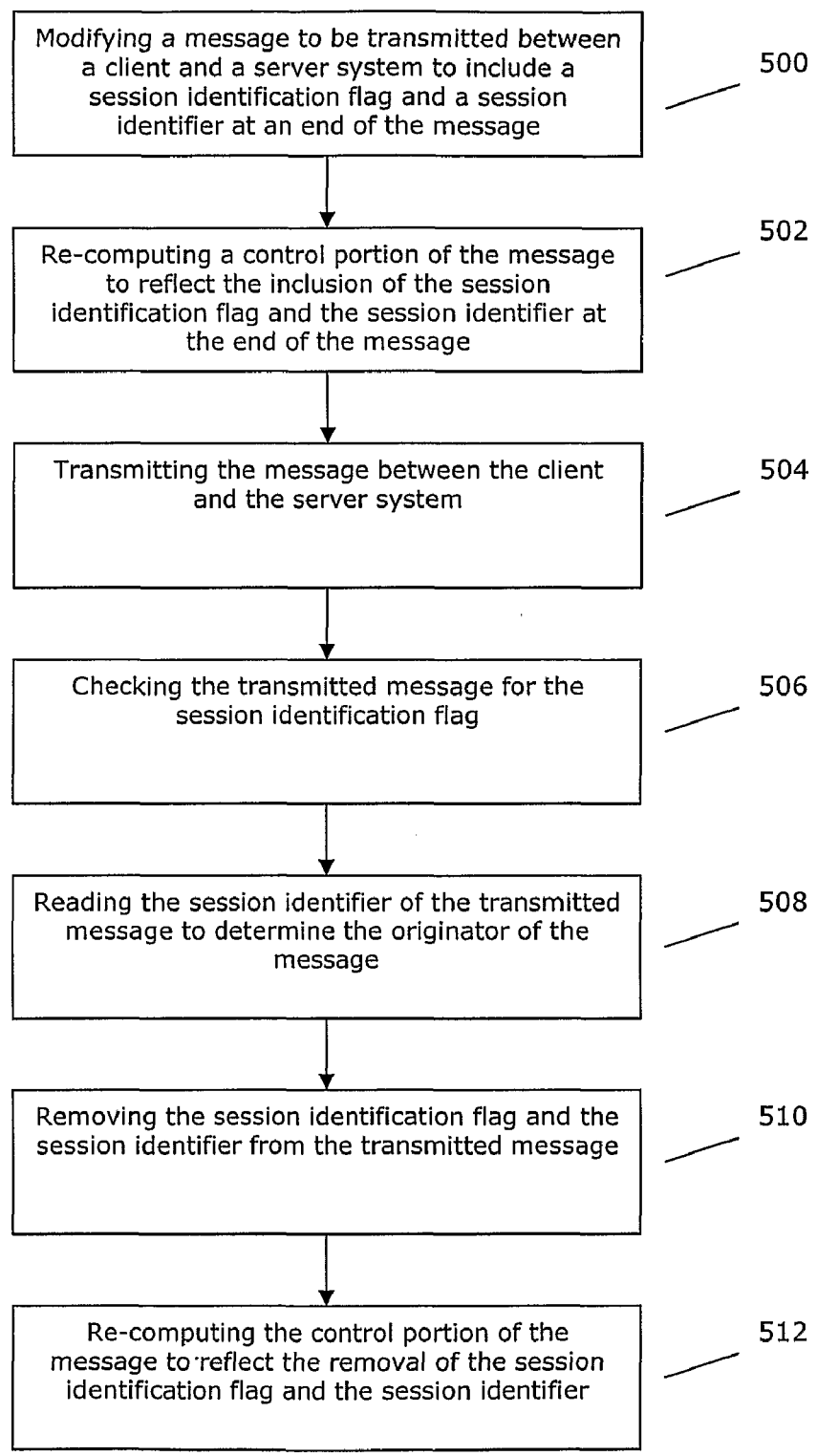
FIG. 5 is a flow diagram illustrating a method of identifying the originator of a message transmitted between a client and a server system in accordance with an exemplary embodiment of the present invention.

FIG. 5 is a flow diagram illustrating a method of identifying the originator of a message transmitted between a client and a server system in accordance with an exemplary embodiment of the present invention. At step 500, a message to be transmitted between a client and a server system is modified to include a session identification flag and a session identifier at an end of the message. At step 502, a control portion of the message is re-computed to reflect the inclusion of the session identification flag and the session identifier at the end of the message. At step 504, the message is transmitted between the client and the server system. At step 506, the transmitted message is checked for the session identification flag. That is, the session identification flag from the transmitted message is compared with an established value to validate the session identifier. At step 508, the session identifier of the transmitted message is read to determine the originator of the message. At step 510, the session identification flag and the session identifier is removed from the transmitted message. At step 512, the control portion of the message is re-computed to reflect the removal of the session identification flag and the session identifier.

In certain situations, there is a chance that the data in an unmodified message will match the session identification flag. If the data in a message is random, this chance is determined by the length of the flag. If the session identification flag is 8 bits long, then the chance for a random match is 1 in $2^8$ or 1 in 256. In such a case, one can calculate the chance that the erroneous session identifier will match that of an actual session identifier in use. If the session identifier is the length of an unsigned long integer, then on the typical system, this will have a length of 8 bytes. This results in about $1.8 \times 10^{19}$ possible session identifiers. If such a system had as many as 10,000 active sessions, the chance that the erroneous session identifier would match that of an active session would only be 1 in $1.8 \times 10^{14}$. Thus, the chance of a message being processed erroneously would only be about 1 in $4.0 \times 10^{16}$. However, the chance that extra work is done to extract the session identifier erroneously is 1 in 256.

Thus, an efficient way to reduce the chance of erroneously processing a message and decreasing the amount of work done is to increase the length of the session identification flag. If the length of the session identification flag were that of an integer (on most systems this would be 4 bytes or 32 bits long), the chance for a random match would be 1 in $2^{32}$ or about 1 in 4 billion.

The security system and the method for embedding a session identifier in the networking protocol disclosed herein have diverse applicability in a range of markets including financial services, horizontal wireless LAN (e.g., wireless sales force automation and contractor services), and government regulated markets such as banking and healthcare. However, these are merely exemplary applications: the present invention is not limited thereto.

Although the present invention has been largely described in terms of providing identification for a user attempting to connect to and communicate a message with a resource/application on a computer system (e.g., and application server), it is not limited thereto. As described herein, for example, the present invention may be embodied in software, in a machine (e.g., a computer system, a microprocessor based appliance, etc.) that includes software in memory, or in a computer readable carrier configured to carry out the protection scheme (e.g., in a self contained silicon device, a solid state memory, an optical disk, a magnetic disk, a radio frequency carrier wave, and audio frequency carrier wave, etc.).

Although the present invention has primarily been described in terms of a message being transmitted between a client and a server, it is not limited to. The identification techniques disclosed herein apply to communications transmitted with respect to a wide range of computer applications, and are not limited to server applications.

The terms message and communication as used herein are intended to refer to a broad class of transmissions carried out between computer systems or portions thereof; for example, inquiries, data updates, data edits, data requests, etc.

Although the invention is illustrated and described herein with reference to specific embodiments, the invention is not intended to be limited to the details shown. Rather, various modifications may be made in the details within the scope and range equivalents of the claims and without departing from the invention.

What is claimed:

1. A method of identifying the originator of a message transmitted between a client and a server system, said method comprising the steps of:
    modifying a message to be transmitted during a session between a client and a server system to include a session identification flag and a session identifier corresponding to an originator of the session on the server system and allowing the originator of the session to be uniquely identified among originators of sessions on the server system;
    transmitting the message between the client and the server system;
    checking the transmitted message for the session identification flag;
    determining, in response to matching the session identification flag with a predefined value, that a valid session identifier has been included as a new portion of the transmitted message during the modification, the new portion available for extraction at a pre-established location within the transmitted message; and
    extracting the session identifier of the transmitted message at the pre-established location to determine the originator of the message,
    wherein if the appended session identifier in the transmitted message is not valid, processing the transmitted communication packet according to one or more predetermined rules for transmitted packets without valid session identifiers.

2. The method according to claim 1, wherein the step of modifying the message comprises the step of re-computing a control portion of the message to reflect the inclusion of the session identification flag and the session identifier.

3. The method according to claim 2, further comprising the steps of:
    removing the session identification flag and the session identifier from the transmitted message; and
    re-computing the control portion of the message to reflect the removal of the session identification flag and the session identifier.

4. The method according to claim 1, wherein the step of modifying the message comprises appending the session identification flag and the session identifier at an end of the message.

5. The method according to claim 1, wherein the step of modifying the message further comprises at least one of changing the session identifier for each communication or changing the session identifier at a predetermined interval.

6. A method of identifying the originator of a communication packet transmitted between a client and a server in a client/server system, said method comprising the steps of:
    appending a session identifier and a security tag to the communication packet, the session identifier uniquely identifying the client in the client/server system;
    determining, in response to matching the security tag with a predefined value, that a valid session identifier has been appended to form a new portion of the communication packet, the session identifier available for extraction at a pre-established location within the communication packet ; and
    extracting the session identifier from the pre-established location to determine the originator of the transmitted communication packet,
    wherein if the session identifier in the transmitted message is not valid, processing the transmitted communication packet according to one or more predetermined rules for transmitted packets without valid session identifiers.

7. The method according to claim 6, further comprising the step of:
    establishing a common security tag in the client and server, wherein the step of appending the session identifier includes appending the common security tag to the communication packet to be transmitted between the client and the server such that a presence of the common security tag in the transmitted communication packet indicates that the session identifier is valid.

8. The method according to claim 6, wherein the step of appending the session identifier and the common security tag to the communication packet comprises the step of re-computing a control portion of the communication packet to be transmitted to reflect the inclusion of the common security tag and the session identifier, the method further comprising the steps of:
    removing the common security tag and the session identifier from the transmitted communication packet; and
    re-computing the control portion of the transmitted communication packet to reflect the removal of the common security tag and the session identifier.

9. The method according to claim 8, further comprising the steps of:
    encrypting the communication packet to be transmitted after the step of appending the session identifier and the common security tag; and
    decrypting the transmitted communication packet prior to the steps of determining the originator of the transmitted communication packet, removing the common security tag and the session identifier, and re-computing the control portion of the transmitted communication packet.

10. The method according to claim 8, further comprising the steps of:
    encrypting the communication packet to be transmitted prior to the step of appending the session identifier and the common security tag; and decrypting the transmitted communication packet after the step of re-computing the control portion of the transmitted communication packet.

11. The method according to claim 7, further comprising the step of:
    setting a length of the common security tag greater than a predetermined length to reduce or substantially eliminate falsely authenticated session identifiers.

12. The method according to claim 11, wherein the length of the security tag is set to a length in the range of about 8 to 64 bits long.

13. A computer system for identifying the originator of a message, comprising
    a server; and
    a client operationally connected to the server, the client and server being configured to transmit one or more messages there between during a session, each of the messages to be transmitted being modified by one of the client or the server to include a session identification flag and a session identifier. the client and server being further configured such that:
    the modified message is transmitted to the remaining one of the client and the server;

the session identification flag of the transmitted message is checked by the remaining one of the client and the server to validate the session identifier;

the remaining one of the client and the server determines, in response to matching the session identification flag with a predefined value, that a valid session identifier has been included as a new portion of the transmitted message during the modification, the new portion available for extraction at a pre-established location within the transmitted message; and the session identifier of the transmitted message is extracted from the pre-established location to determine the originator of the transmitted message, the session identifier corresponding to an originator of a session on the server system and allowing the originator of the session to be uniquely identified among originators of sessions on the server system, wherein if the session identifier in the transmitted message is not valid, processing the transmitted communication packet according to one or more predetermined rules for transmitted packets without valid session identifiers.

14. The computer system according to claim 13 further comprising a network gateway disposed operationally between the client and server and providing access to the server such that the server is remotely accessible by the client.

15. The computer system according to claim 14 further comprising:
an encrypting unit disposed on one side of the network gateway to encrypt the message to be transmitted.

16. The computer system according to claim 15, further comprising: a decrypting unit disposed on another side of the network gateway to decrypt the transmitted message.

17. The computer system according to claim 16, wherein the message is processed sequentially such that either the message to be transmitted is encrypted by the encrypting unit and then modified and the transmitted message is read and then decrypted by the decrypting unit or the message to be transmitted is modified and then encrypted by the encrypting unit and the transmitted message is decrypted by the decrypting unit and then read.

18. The computer system according to claim 14, wherein the network gateway includes a database to validate the session identifier by checking a user identifier, if the session identifier is not valid, the computer system forces the user to log in prior to accessing the server and if the session identifier is valid, the computer system retrieves an associated user identifier and the server processes the transmitted message.

19. A non-transitory computer readable storage medium including computer program instructions which cause a computer system including at least a client and a server to implement a method of identifying the originator of a message transmitted between the client and the server, said method comprising the steps of:
modifying a message to be transmitted during a session between the client and the server to include a session identification flag and a session identifier, the session identifier being assigned corresponding to the originator of the session on the server system and allowing the originator of the session to be uniquely identified among originators of sessions on the server system;

re-computing a control portion of the message to reflect the inclusion of the session identification flag and the session identifier;

transmitting the message between the client and the server;

checking the transmitted message for the session identification flag;

determining, in response to matching the session identification flag with a predefined value, that a valid session identifier has been included as a new portion of the transmitted message during the modification, the new portion available for extraction at a pre-established location within the transmitted message;

extracting the session identifier of the transmitted message from the pre-established location to determine the originator of the message;

removing the session identification flag and the session identifier from the transmitted message; and re-computing the control portion of the message to reflect the removal of the session identification flag and the session identifier.

20. A method of identifying the originator of a message transmitted between a client and a server, comprising:
modifying, by a processor, a message to be transmitted during a session between a client and a server to include a session identification flag and a session identifier, the session identifier being assigned corresponding to the originator of the session on the server system and allowing the originator of the session to be uniquely identified among originators of sessions on the server system;

re-computing, by the processor, a control portion of the message to reflect the inclusion of the session identification flag and the session identifier;

transmitting the message between the client and the server;

checking the transmitted message for the session identification flag;

determining, in response to matching the session identification flag with a predefined value, that a valid session identifier has been included as a new portion of the transmitted message during the modification, the new portion available for extraction at a pre-established location within the transmitted message;

extracting the session identifier of the transmitted message from the pre-established location to determine the originator of the message;

removing the session identification flag and the session identifier from the transmitted message; and re-computing, by the processor, the control portion of the message to reflect the removal of the session identification flag and the session identifier.

* * * * *